B. E. MEACHAM.
AUTOMATIC WATER HEATER.
APPLICATION FILED SEPT. 30, 1909.
1,082,131.
Patented Dec. 23, 1913.
5 SHEETS—SHEET 4.
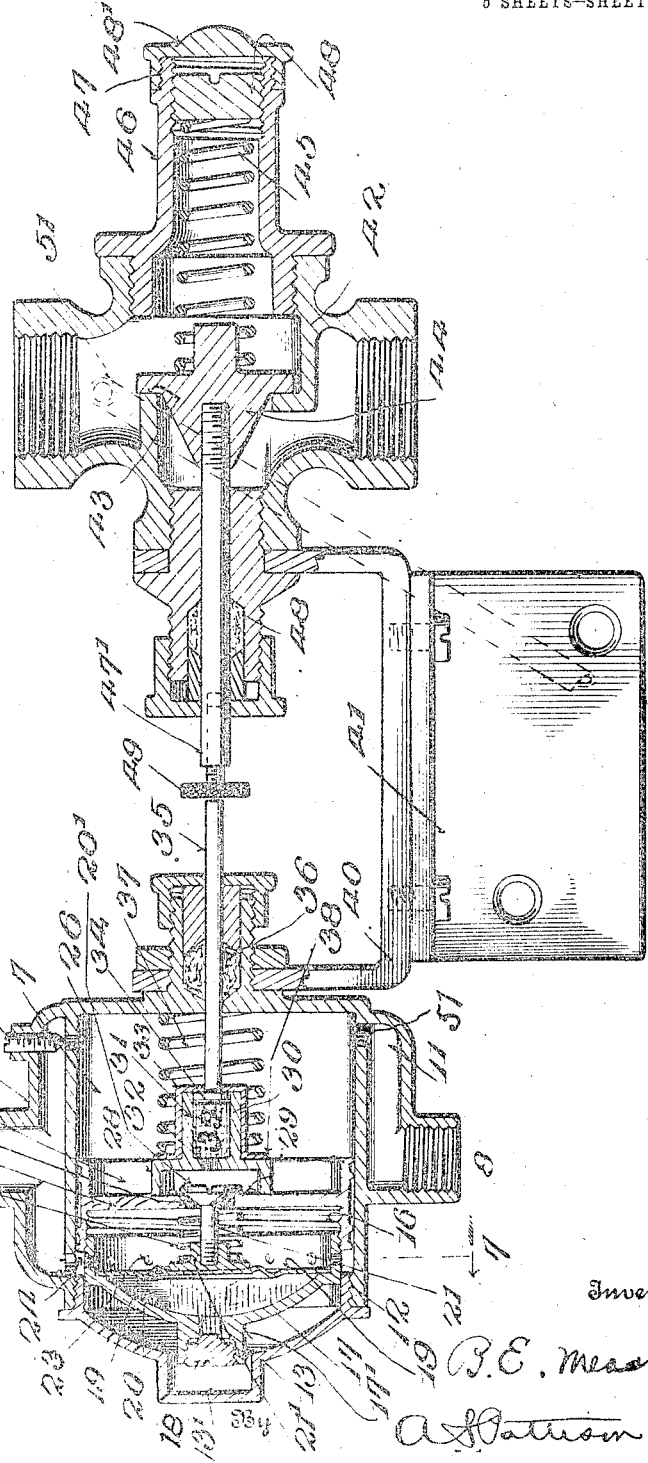
Witnesses
Inventor
B. E. Meacham
Attorney B. E. MEACHAM.
AUTOMATIC WATER HEATER.
APPLICATION FILED SEPT. 30, 1909.
1,082,131.
Patented Dec. 23, 1913.
5 SHEETS—SHEET 5.
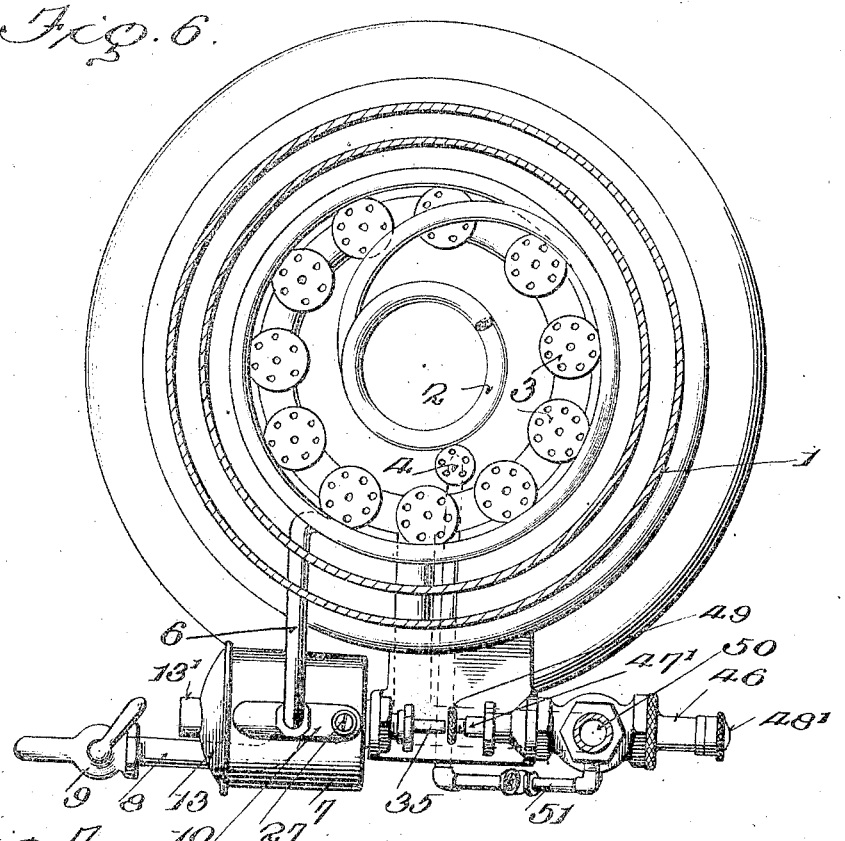
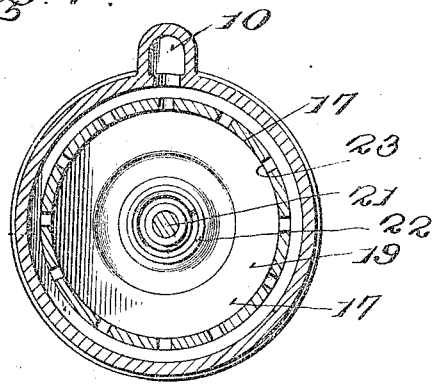
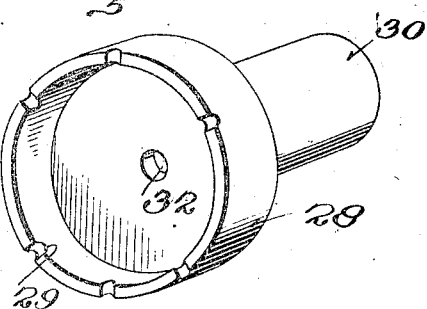
Witnesses
Inventor
B. E. Meacham,
By A. S. Pattison,
Attorney

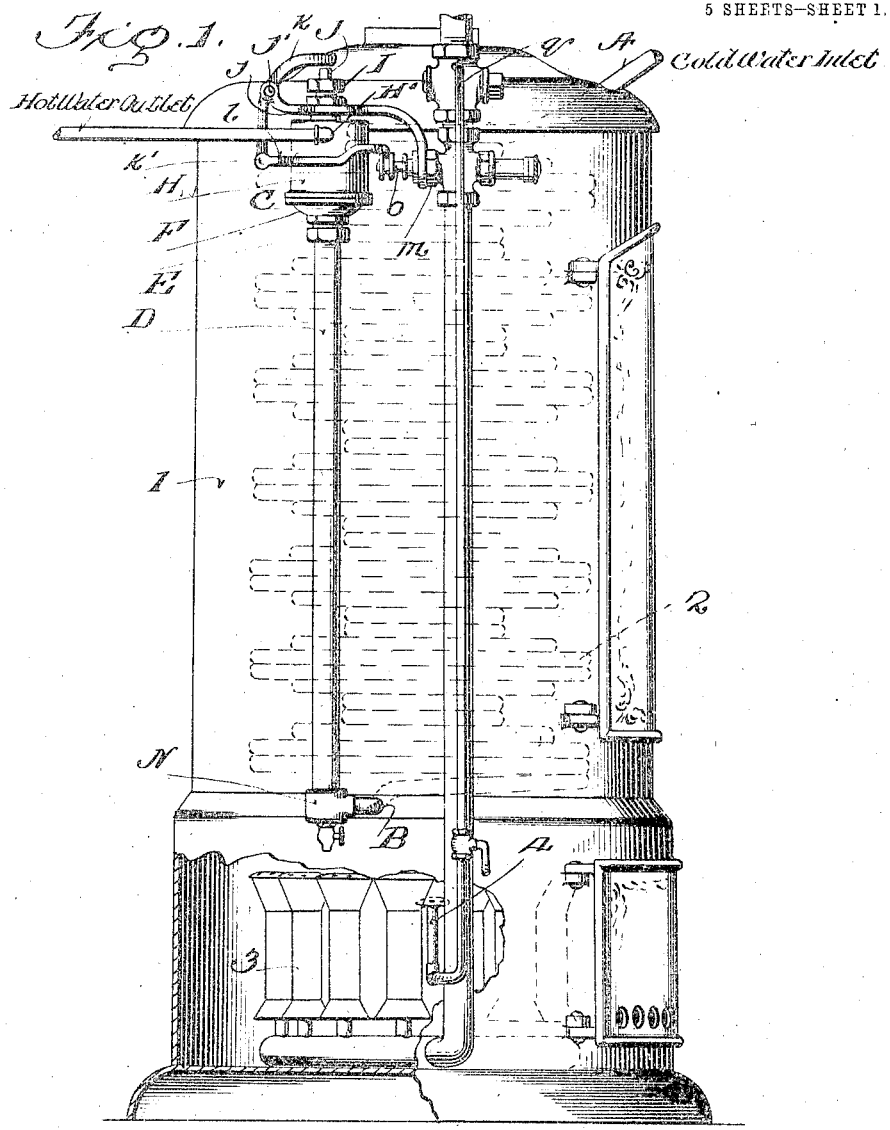

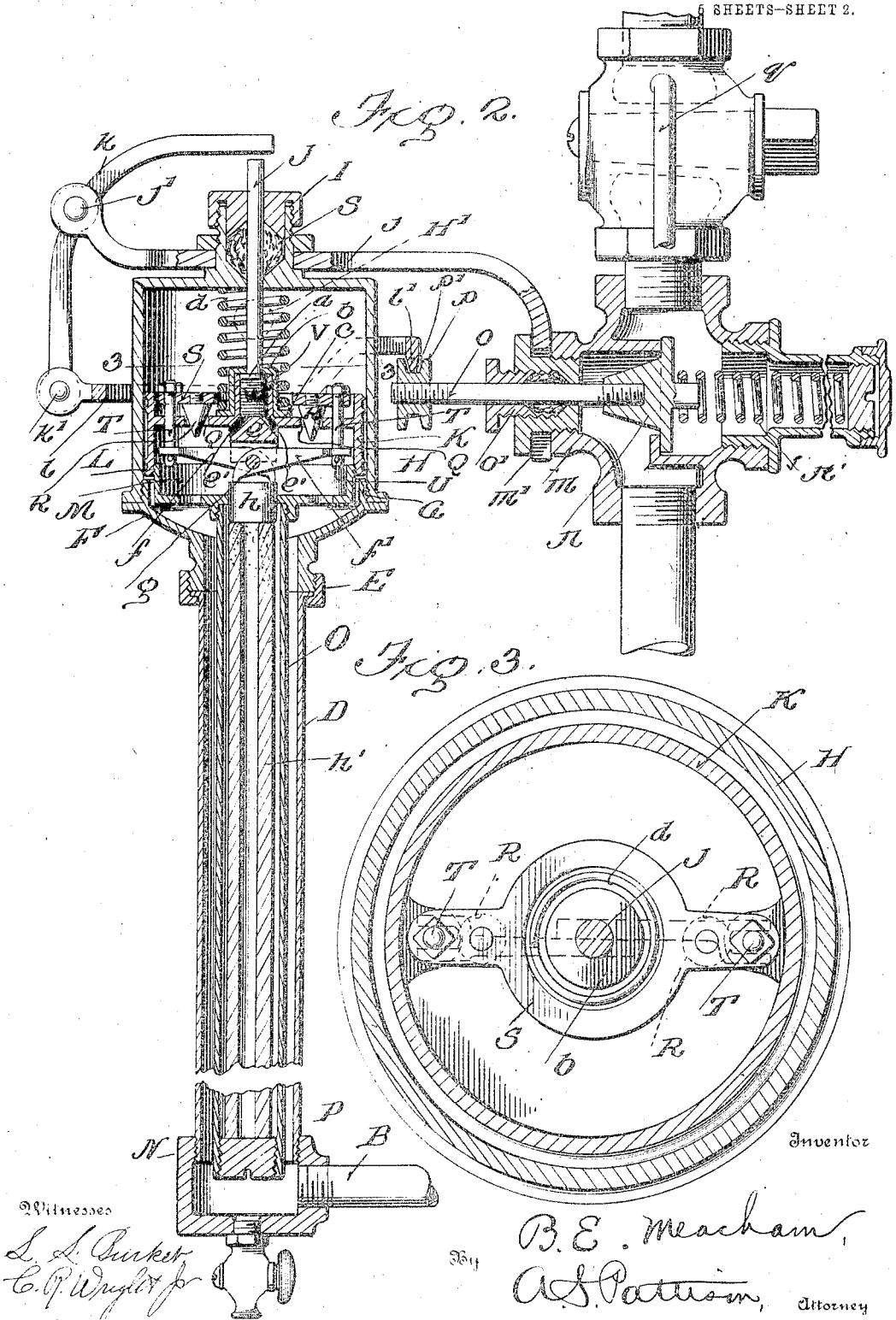

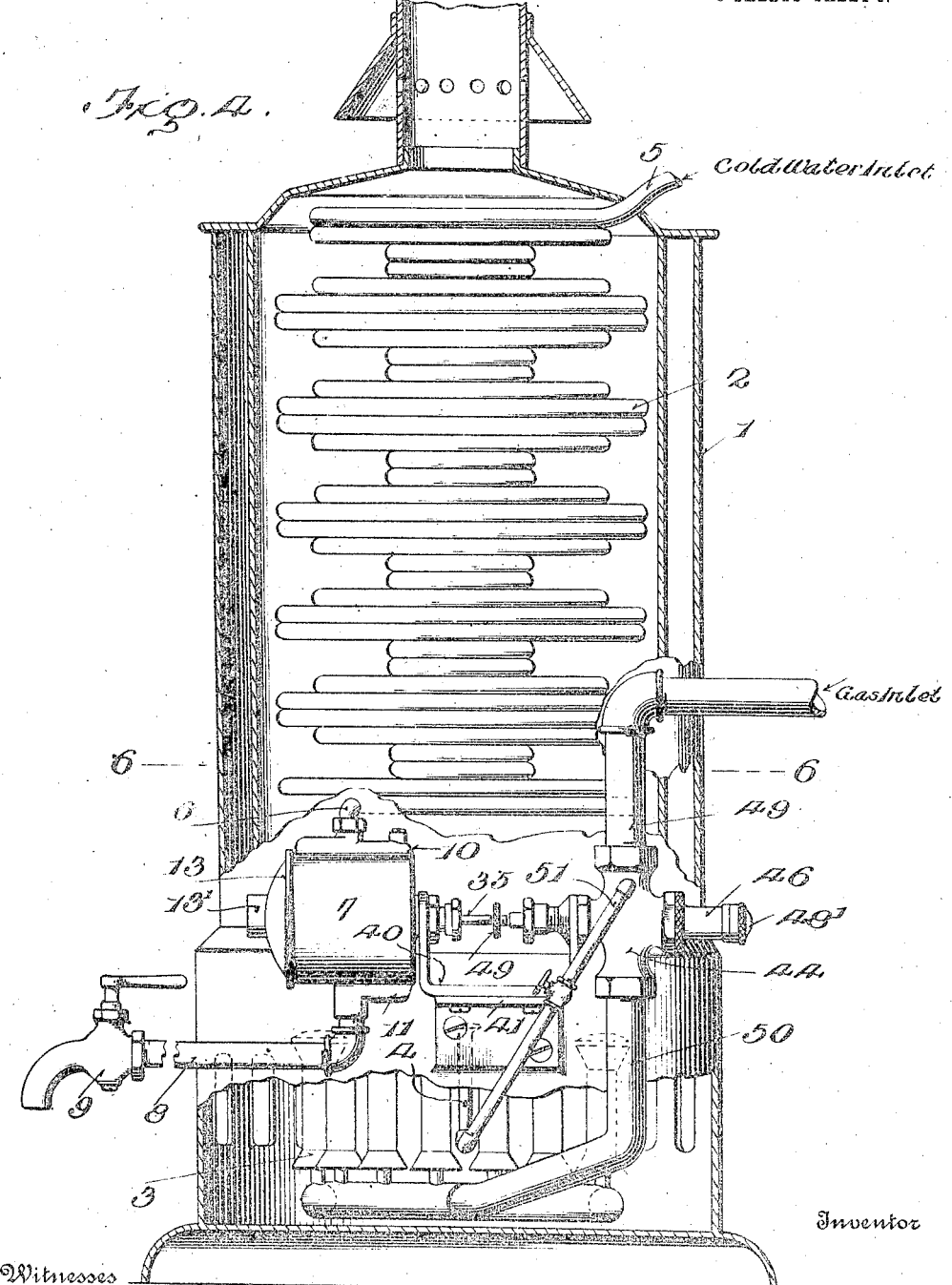

UNITED STATES PATENT OFFICE.

BENJAMIN E. MEACHAM, OF LORAIN, OHIO, ASSIGNOR TO AMERICAN STOVE COMPANY, OF ST. LOUIS, MISSOURI.

AUTOMATIC WATER-HEATER.

1,082,131.  Specification of Letters Patent.  Patented Dec. 23, 1913.

Application filed September 30, 1909. Serial No. 520,243.

*To all whom it may concern:*

Be it known that I, BENJAMIN E. MEACHAM, a citizen of the United States, residing at Lorain, in the county of Lorain and State of Ohio, have invented certain new and useful Improvements in Automatic Water-Heaters, of which the following is a specification, reference being had therein to the accompanying drawing.
My invention relates to improvements in automatic water heaters.

The object of my invention is to provide a heater which automatically controls the flow of gas to the burner and the flow of water to the spigot and thus retard the flow of cold water through the heater in starting. The retarding or holding back of the water in the heater allows it to become heated more quickly, saving fuel and saving the drawing of a large quantity of cold, or partially heated, water before hot water is obtained, as is the case in other heaters of this character.

Another object of my invention is to provide a more simple, cheap and effective heater of this character.

In the accompanying drawings: Figure 1 is a side elevation of a water heater showing my invention applied thereto. Fig. 2 is an enlarged vertical sectional view of the water and gas regulating valves. Fig. 3 is a transverse sectional view taken on the line 3—3 of Fig. 2. Fig. 3ª is a top plan view of Fig. 1, showing the casing broken away.
Fig. 4 is a side elevation of a modified form of heater. Fig. 5 is an enlarged horizontal sectional view of the water and gas regulating valve of the modification shown in Fig. 4. Fig. 6 is a transverse sectional view taken on the line 6—6 of Fig. 4. Fig. 7 is a transverse sectional view taken on the line 7—7 of Fig. 5. Fig. 8 is an enlarged perspective view of the gas valve operating piston of the modification shown in Figs. 4 to 8, inclusive.

Referring now to the drawings, 1 represents the usual vertical drum or casing of heaters of this character in which is arranged the water pipe coil 2, and below which is arranged the gas burner 3, all of which is of the usual structure and needs no further description. In heaters of this character, the burners are arranged in a concentric row below the coil, and there is a pilot light 4 always burning, whereby the main burners are lighted when the gas supply therefor is opened. Heretofore heaters of this character have been so arranged that the water supply controlled the gas supply and in turning on the water supply there was a full flow of cold water through the heater for a period of time before the hot water was supplied. In my improved heater the flow of water is nearly entirely cut off until it has been sufficiently heated when a full flow of water is permitted and thus avoiding the waste of water and fuel. The coil is supplied with cold water at its upper end from a pipe A. and the water is discharged from the coil through a pipe B. My improved regulator C is vertically disposed beside the drum and is formed of a tube D, having its lower end connected to the pipe B, and said tube receiving the heated water therefrom. The upper end of the tube D, has secured thereto by the coupling E the spherical member F, and the upper end of the member F is externally threaded at G and having screwed thereon the cylinder H, which, as shown, is in communication with the tube through the spherical member F. The upper end of the cylinder H is closed and is provided with a stuffing box I, through which extends the piston rod J. The said piston rod carries at its lower end the piston K, which moves vertically in the cylinder H and forms a tight connection with the inner face thereof by means of the usual packing, all of which is old and needs no further description. The piston K, as shown, is of an elongated form so as to give a broad bearing surface with the cylinder and for other purposes which will be hereinafter more fully described. The lower end of the piston is internally screw-threaded at L, and to which is screwed the upper end of the saucer-shaped member M, which is adapted to reciprocate with the piston. The tube D is secured at its lower end to a coupling N to which is also connected the hot water discharge pipe B from the coil 2.

Secured and screwed to the saucer-shaped member M, is a copper tube O, which has its lower end extending downwardly within the tube D and has screwed therein a plug P. This tube O, as before stated, is made of copper, which is affected by the temperature of the water in the tube D, and therefore expands, as will be hereinafter more fully described.

The piston K is provided with openings Q, which are closed by valves R, but the connection between the valve and the openings is such that there is a slight leakage of water around the valve, the object of which will also be hereinafter more fully described. The valves R are carried by a plate S, which is provided with rods T, which extend through the piston and are provided at their lower ends with the transverse pins U. The piston is also provided with a central upwardly extending nipple V, which is filled with a fusible material, as indicated at W. Resting upon the fusible material within the nipple is an enlarged head $a$ of the piston rod J, whereby the piston rod is held against inward movement. The piston rod is retained in the nipple by means of a cap $b$, which has at its lower end a laterally turned portion $c$. Surrounding the piston rod J, is a coiled spring $d$, which has its upper end bearing against the end of the cylinder, and the lower end surrounding the cap and bearing against the laterally turned portion $c$ thereof. This spring as will be seen, effects a downward pressure upon the piston and holds it in its downward position against the pressure of the water. The piston is provided on its lower face with a stud $e$ to which is pivoted the arms $f$ and $f'$, by means of the spring. The said stud is provided with the oblique openings $e'$, which communicate with the nipple V, and which allows the fusible material to pass therefrom when it has fused. The arms $f$ and $f'$ have downwardly turned inner ends which bear against the plug $h$ carried by the porcelain tube $h'$. This tube $h'$ extends downwardly within the copper tube and is rigidly attached to the plug P carried by the copper tube O.

The stuffing box I has surrounding the same an arm $j$, which has pivoted at its outer end the curved lever $k$ pivoted at $j'$. The outer or upper end of the arm is curved over the cylinder and is in a vertical alinement directly above the piston rod J, and adapted to be engaged by the said rod. The lower end of the lever $k$ is pivoted at $k'$ to the arm $l$. The arm $j$ is supported by the gas valve case $m$ at $m'$.

The gas valve case $m$ is provided with a valve $n$ seated by the spring $n'$, and said valve case and valve being constructed in the same manner as the valve and valve case in the modification, and which will be hereinafter more fully described. The valve $n$ is provided with a valve stem $o$ passing through the stuffing box $o'$ and the outer end of the stem has screwed thereon the member $p$, having the circumferential groove $p'$ into which extends the lug $l'$ carried by the arms $l$. The outer ends of the arms $f$ and $f'$ are bifurcated as clearly shown in Fig. 3, of the drawings, and straddle the rods T and bear upon the studs $u$.

The cylinder H adjacent its upper end is provided with an opening H', to which is connected the discharge pipe which leads to the spigot or other source of discharge. The valve case $m$ is provided with a small pipe $q$, which leads down to the pilot light 4, and is at all times supplying gas thereto.

The pilot light being at all times burning, the water being shut off so that no water can pass through the cylinder, the water pressure on each side of the piston will be the same and therefore the piston will be in position shown in Fig. 2 of the drawings. When the spigot is opened, the water pressure above the piston is released and water pressure below the piston will move the same upwardly causing the piston rod J to engage the pivoted curved lever $k$ and rock the same on the pivot $j'$. The rocking of the lever $k$ will move the arm $l$ to the right which, in turn, moves the valve stem $o$ moving the same to the right and unseating the valve $n$. The gas is then allowed to flow through the pipe $q$ to the pilot burners and by means of which the main burner is lighted. The water in the coil is then becoming heated and the slight leakage around the valve R, allows the cold water gradually to flow from the cylinder below the piston and the tube D is therefore filled with heated water. When the water has become heated to a certain degree the copper tube O expands or lengthens. The porcelain tube $h'$ is not affected by the heat and therefore will not be moved outwardly by any expansion. The hot water in the tube D expands the tube O and causes the porcelain tube $h'$ to move downwardly with the tube O and allowing the valves R to move from the seats by the water pressure to allow the heated water to pass from the heater. The distance between the head $h$ and the pivot $g$ is therefore increased allowing the arms $f$ and $f'$ to move upwardly by the pressure of the water on the valve R and therefore the valves are unseated by the pressure of the water and a full flow of water is permitted through the cylinder to the spigot. The pressure of the water on the lower face of the piston holds the same in an upward position and also holds the valves open. Shutting of the spigot causes an equal pressure on the upper and lower sides of the piston and balances the same. The spring $n'$ of the gas valve forces the stem $o$ down which in turn carries the arm $l$ to the left. The gas valve is thus shut. The arm $l$ rocks the lever and the upper end thereof engages the piston rod J and forces the piston in its downward position. The valves R still remain open, but as the water in the tube D cools the copper tube O contracts pulling the porcelain upward, causing the arms f and f' to engage the block h forcing the outer ends of the arms downwardly. The arms straddling the rod T and engaging the pins U will draw the plate S downwardly and cause the valves to seat themselves.

In order to prevent the device from overheating should the piston K stick in the cylinder when the water is cut off, the fusible plug will fuse allowing the valve piston j to be forced downwardly in the nipple by the pressure of the spring n' of the gas valve n, the fused plug being forced from the nipple through the openings e'. When this occurs, it will be seen that the gas valve is shut off and the burners extinguished. After the plug is fused in order to again operate the several parts have to be separated and a new plug placed therein.

In order to adjust the device at different degrees of temperature at which the valve is opened the member P is adjustable on the valve stem o, as shown.

In the modification shown in Figs. 4 to 8, the coil 2 is likewise supplied with cold water from a pipe 5 at the upper end of the coil. The lower end of the coil has a water discharge pipe leading through the casing 1 and connected to the cylinder 7. The opposite side of the cylinder has a discharge 8 connected thereto and which leads to the desired point, but for the convenience of illustration, I have shown the faucet 9 connected to the pipe adjacent the casing. The cylinder 7 is provided at its upper side with a passage 10 extending approximately the whole length of the cylinder and to which is connected the pipe 6 leading from the coil 2. The opposite side of the cylinder is provided with a passage 11 on the outside of the cylinder, and which extends from the rear end to about midway its length and this passage has the discharge pipe 8 connected and in communication therewith. The cylinder has its outer end interiorly screw threaded at 12, and into which is screwed a cylinder head 13, which is of a convex form as shown in Fig. 5. Within the cylinder is a piston 14, having a central web-portion 15 having an opening 15' in the center thereof. The said piston is internally threaded at 16 and into which is screwed the cap 17, which is of a convex form of the same shape as the head 13 of the cylinder. The head 13, as shown, is provided with a cylindrical extension 13' adapted to receive the nipple 17' carried by the cap 17 of the piston. This cap forms a hollow piston, as will be hereinafter more fully described. The nipple 17' is provided with a passage-way therethrough and said passage is closed by a screw-threaded plug 18. Carried by the cap and rigidly secured thereto is a diaphragm 19 which forms a space 20 in the end of the cap 17. The diaphragm, as before described, is secured to the cap and in such a manner that the space 20 is perfectly air-tight. This space 20 is partially filled with a volatile fluid that will vaporize at a desired temperature and is hermetically sealed by the plug 18. The expansion of this fluid, caused by the hot water, will move the diaphragm inwardly. Closing the opening 15' in the web 15 is a valve 20' opening inwardly and the valve-stem 21 extending outwardly adjacent the diaphragm. The outer end of the valve stem is provided with an enlarged nut 21', which bears against the diaphragm. Surrounding the stem 21 is a coil-spring 22, which bears against the web 15 and the nut 21' and normally holds the valve in the closed position, as shown in Fig. 5 of the drawings. The cap 17 on the inside of the diaphragm 19 is provided with a series of openings 23 around the periphery and which register with the annular passage 24 between the piston 14 and the cap 13. This annular passage-way communicates with openings 25 communicating with the chamber or passage 10 and whereby the water is adapted to enter the piston between the web 15 and the diaphragm. The valve 20' is so constructed that there is a slight leakage through or around the same, when in its normal closed condition, so as to establish a slight circulation of the water in the initial starting of the heater. My improved device is regulated by the difference of pressure on the inlet and delivery side of the piston by restricting or increasing the flow of water through the piston or can be regulated for different temperatures by the by-pass 26 in the passage 10 which is controlled by the screw 27 secured through the side of the cylinder as clearly shown in Fig. 5. The piston 15 has no rigid or positive piston rod connection, but bearing against the inner side of the piston is a saucer-shaped member 28, which is of a diameter considerably greater than the passage 15' in the web and said member 28 is provided with recesses 29 in its edge which form passages to allow the water to flow from the same. The saucer-shaped member is provided with a nipple 30, having a recess 31 in its outer end communicating with the saucer-shaped member through the opening 32. Closing the outer end of the nipple 30 is a cap 33, and within the recess is a piston 34. Connected to the piston 34 is a piston rod 35 which extends outwardly through the cap and through the stuffing box 36 in the end of the cylinder. Surrounding the cap is a coiled-spring 37, which has one end bearing against the end of the cylinder and the opposite end bearing against the flange 38 of the cap, and whereby the saucer-shaped member 28 is held tight against the piston. Within the recess 30 is a fusible plug 39, which normally holds the piston 34 in an outward position. This fusible plug 39 is made of a material that will fuse at a certain temperature and should the piston 14 become stuck in the cylinder by the water becoming too hot or should it stick after the water is shut off, the plug will fuse and the piston 34 will be forced inwardly to allow the gas to be cut off which will be hereinafter more fully described. The cylinder 7 is supported by a U-shaped bracket 40 which is secured to a plate 41, which is attached to the side of the casing 1 of the heater. The cylinder, as before stated, is secured to one arm of the bracket 40, while the valve case 42 is carried by the other arm of the bracket. This valve case is in a horizontal alinement with the cylinder and concentric therewith. The valve case is provided with a valve seat 43, upon which is seated the valve 44 held in said position by a spring 45, which is held in the tubular extension 46 of the casing 42. The outer end of the tubular extension is internally threaded at 47 and in which is screwed a plug 48, whereby the tension of the spring 45 on the valve 44 may be increased or decreased as in desired and necessary. The tubular member 46 is provided with a cap 48', which guards against any possible leakage of gas from the casing. The casing has connected thereto the gas supply-pipe 49, and the gas discharge pipe 50 leading to the burners. Connected to the casing 44, adjacent the supply pipe 49 is a small pipe 51, which leads to the pilot light or burner 4, whereby the same is always supplied with gas so that the pilot light is not extinguished upon the operation of the valve. The valve 44 is provided with a valve-stem 47', which extends outwardly through a stuffing box 48 carried by the casing and said valve stem is in an exact horizontal alinement with the piston rod 35, whereby the piston rod 35 engages the valve stem and unseats the gas-valve, as will be later more fully described. The end of the valve-stem 47' has screwed therein a thumbscrew 49, which has an enlarged head against which the piston-rod abuts and the enlarged head making an enlarged abutting face for the piston-rod. The screw 49 is adjusted within the valve stem whereby the valve is operated by a greater or less movement of the piston-rod 35.

In operation, the pilot-light of the heater is at all times burning and the coil 2 is filled with water. The spring 37 holds the saucer-shaped member 28 up against the web 15 of the piston 14, and thus holding the piston in the position shown in Fig. 5. The piston rod 35 is therefore held away from the valve stem and gas supply is cut off. When it is desired to draw hot water, the faucet 9 is opened, the water flows into the passage 10 and out through the opening 25 into the space 24 and forcing the piston 14 to the right, Fig. 5, causing the piston rod 35 to engage the valve stem 47', opening the valve 44 and allowing the gas to flow to the burners 3, where it is ignited. In order to equalize to a certain amount the water pressure on each side of the piston, water passes through the opening 26 communicating with the passage 11, whereby there would be a slight flow of water through the spigot. The burners having been lighted the water is becoming heated and is passed from the space 24 through the opening 23 within the piston and the valve 20' not fitting tight, as heretofore described, a certain amount of water passes out through the valve and through the opening 26, into the passage 11 and thence out through the faucet, this flow of water being very small compared with the full flow that will pass through the faucet when the water has become heated to a certain temperature. There being a circulation or flow of water through the compartment or space within the piston it will be seen that the water rapidly becomes heated. The hot water within this space after it has risen to a certain temperature, causes the volatile liquid in the space 20 to vaporize forcing the diaphragm rearwardly which forces the valve stem 21 inwardly and unseats the valve 20' and allows the full flow of water through the valve. The water enters the saucer-shaped member and passes outwardly through the openings 29 into the passage 11 and out through the faucet. When the faucet is turned off the pressure of the water in the cylinder becomes equal on each side of the piston so that the spring 37 returns the piston 14 to its normal position which carries with it the piston rod 35, releasing the valve stem and the spring 45 seating the valve 44 and cutting off the gas. Should, for any reason, the piston refuse to return to its normal position when the faucet is shut off, in order to prevent the overheating of the water and burning out of the heater, the fusible plug 39 will fuse and the spring 45 will force the valve back to its seat and the piston 34 will move in the nipple 30, forcing the fused plug out through the opening 32 and thus cutting off the flow of gas. When this occurs it is impossible to again start the burner by operating the faucet until the severed parts are separated and cleaned and a new fusible plug placed in the nipple.

While I have shown my automatic regulator applied to this form of heater, it will be understood that this all can be varied without departing from my invention.

Having thus described my invention, what I claim and desire to secure by Letters Patent is:

1. In a liquid heater, the combination of a liquid chamber in the pipe line from the heater, a reciprocating piston in said chamber, means carried by said piston for retarding the flow of water through the chamber until it has become heated, and means connected with the piston for opening the gas valve.

2. A device of the character described, comprising a heating coil, a cylinder receiving the water therefrom, a water discharge connected from the cylinder, a piston in the cylinder, a gas supply valve adjacent the cylinder, means operated by the piston for operating the valve, and automatic means carried by the piston for controlling the discharge of water from the cylinder, and operated by the temperature of water.

3. A device of the character described, comprising a cylinder, a water supply and discharge connected to the cylinder, a piston in the cylinder, a gas supply valve adjacent the cylinder, means operated by the movement of the piston for operating the valve and thermostatic means carried by the piston for controlling the discharge of water from the cylinder.

4. A device of the character described, comprising a cylinder, a piston therein and adapted to control the gas supply by water pressure on the piston, thermostatic means carried by the piston for controlling the discharge of the water from the cylinder.

5. A device of the character described, comprising a cylinder, a piston therein, and adapted to control the gas supply by water pressure thereon, thermostatic means carried by the piston for controlling the discharge of the water from the cylinder, and a fusible plug capable of allowing the gas valve to close.

6. The combination with a heater, a cylinder adjacent thereto and having a supply connected with the heater, a discharge from the cylinder, a gas supply valve concentric with the cylinder, a piston in the cylinder and moved by the water pressure in the cylinder, means operated by the piston for operating the valve, and thermostatic means carried by the piston for controlling the water discharged from the cylinder.

7. The combination with a heater, of a cylinder adjacent thereto and through which the water from the heater passes, a piston within the cylinder and adapted to control the gas supply to the heater, a valve carried by the piston and controlling the flow of water through the cylinder, and thermostatic means for controlling said valve.

8. The combination with a heater, of a cylinder adjacent thereto and through which the water from the heater passes, automatic means for retarding the flow of water through the cylinder, a piston within the cylinder and adapted to control the gas supply to the heater, and a fusible plug within the cylinder and adapted to allow the gas valve to close should the piston stick in the cylinder.

9. The combination with a heater, of a cylinder adjacent thereto and through which the water from the heater passes, a piston within the cylinder, means operated by the piston for opening the gas valve, a valve carried by the piston and controlling the water supply through the cylinder and thermostatic means operating said valve carried by the piston.

10. The combination with a heater, of a cylinder adjacent thereto and through which the water from the heater passes, automatic means for retarding the flow of water through the cylinder, a piston in the cylinder, a piston rod operated by the piston and operating the gas supply valve, and a fusible plug connection between the piston and piston rod.

11. The combination with a heater, of a cylinder adjacent thereto and through which the water from the heater passes, a piston in the cylinder, thermostatic means carried by the piston for controlling the flow of water through the cylinder, a piston rod operated by the piston and opening the gas supply valve, and a fusible plug connection between the piston and the piston rod.

12. The combination with a heater, of a cylinder adjacent thereto and through which the water passes from the cylinder, a movable member operated by the water pressure in the cylinder for opening the gas supply pipe, valves in said cylinder for controlling the supply of water through the cylinder, a tube within the cylinder, leaves connecting the tube with the valve whereby the temperature of the water extends or expands the tubes and opens said valve to allow the valve to pass through said cylinder.

13. The combination with a heater, of a cylinder adjacent thereto and through which the water passes from the cylinder, a piston in the cylinder and operated upon by the pressure of the water in the cylinder, means operated by the piston for opening the gas supply valve, valves carried by the piston, pivoted levers carried by said piston, a porcelain tube engaging the levers to prevent the valve from being unseated, and a tube carried by the cylinder and adapted to expand by the temperature of the water in the cylinder and move the piston and valve levers away from the porcelain tube whereby the pressure of the water will unseat the valve.

14. The combination with a heater, of a cylinder adjacent thereto and through which the water passes from the cylinder, a piston in the cylinder and operated upon by the pressure of the water therein, a piston rod extending from the cylinder, means operated by the piston rod for opening a spring closed gas supply valve, said piston having passages therethrough, valves closing said passage but allowing a slight flow of water therethrough, intermediately pivoted levers carried by the pistons, the outer ends of the arms connected to the valves, a porcelain tube engaging the inner ends of the levers to limit the downward movement thereof, a copper tube surrounding the porcelain tube and connected to the piston whereby the expanding of the copper tube moves the piston away from the porcelain tube and allows the pressure of the water to open the valve.

15. A device of the character described, comprising a cylinder, a water supply and discharge connected to the cylinder, a piston within the cylinder and thermostatic means carried by the piston for controlling the discharge of water from the cylinder.

16. A device of the character described, comprising a cylinder, a water supply and discharge connected to the cylinder, a piston in the cylinder, a gas supply valve adjacent the cylinder, means operated by the movement of the piston for operating the valve, and means carried by the piston and controlled by the temperature of the water for controlling the discharge of water from the cylinder.

17. The combination with a heater, of a cylinder adjacent thereto and through which the water passes from the heater, a piston in the cylinder and operated upon by the pressure of the water in the cylinder, means operated by the movement of the piston for opening the gas supply valve to the burners, valves carried by the piston, and an expansible tube carried by the piston and adapted to expand by the temperature of the water in the cylinder and move the piston and valves whereby the pressure of the water will unseat the valves, substantially as shown and described.

18. In a water heater the combination of a water heating chamber provided with a discharge passage, a heating element for the water in said chamber, a motor actuated by the water which flows through said water heating chamber for controlling said heating element, and means carried by the moving element of said motor for varying the flow of the water through the water heating chamber according to the variations of the temperature of the heated water within the said discharge passage.

19. In a water heater, the combination of a water heating chamber provided with a discharge passage, a heating element for the water in said chamber, a motor actuated by the water which flows through the said water heating chamber for controlling said heating element, said motor being formed with a valve-controlled passage for the water and means carried by the moving element of said motor for governing the valve of said valve-controlled passage according to the variations of the temperature of the heated water within the said discharge passage.

20. In a water heater the combination of a water heating chamber provided with a discharge passage, a burner for heating the water in said chamber, a water actuated piston in said discharge passage adapted to control the flow of fuel to said burner, said piston being formed with a valve-controlled passage for the water, and a thermostat carried by said piston for governing said valve-controlled passage according to the variations of the temperature of the heated water within said discharge passage.

In testimony whereof I hereunto affix my signature in the presence of two witnesses.

BENJAMIN E. MEACHAM.

Witnesses:
C. E. VAN DEUSEN,
A. C. CALHOUN.